US012594818B2

(12) United States Patent
Ito

(10) Patent No.: US 12,594,818 B2
(45) Date of Patent: Apr. 7, 2026

(54) VEHICLE

(71) Applicant: KAWASAKI MOTORS, LTD., Hyogo (JP)

(72) Inventor: Kouji Ito, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 361 days.

(21) Appl. No.: 18/335,202

(22) Filed: Jun. 15, 2023

(65) Prior Publication Data

US 2024/0416724 A1 Dec. 19, 2024

(51) Int. Cl.
| | |
|---|---|
| *B60H 1/24* | (2006.01) |
| *B60H 1/00* | (2006.01) |
| *B62D 25/04* | (2006.01) |
| *B62D 25/20* | (2006.01) |
| *B60K 26/02* | (2006.01) |
| *B60N 2/01* | (2006.01) |
| *B60R 21/13* | (2006.01) |

(52) U.S. Cl.
CPC ......... *B60H 1/246* (2013.01); *B60H 1/00407* (2013.01); *B62D 25/04* (2013.01); *B62D 25/2036* (2013.01); *B60K 26/02* (2013.01); *B60N 2/01* (2013.01); *B60R 21/13* (2013.01); *B60R 2021/137* (2013.01)

(58) Field of Classification Search
CPC ................ B60H 1/246; B60H 1/00407; B60H 1/00564; B60R 21/13; B60R 2021/137
See application file for complete search history.

(56) References Cited

U.S. PATENT DOCUMENTS

| | | | | |
|---|---|---|---|---|
| 2,882,809 | A * | 4/1959 | Nelson ................... | B60H 1/246 |
| | | | | 454/144 |
| 6,857,955 | B1 | 2/2005 | Held | |
| 7,396,062 | B2 * | 7/2008 | Hung ........................ | B60R 7/04 |
| | | | | 296/37.8 |
| 10,787,060 | B1 * | 9/2020 | Mayr ...................... | B62D 21/17 |
| 10,988,187 | B2 * | 4/2021 | Schounard ............. | B62D 31/00 |
| 2017/0182861 | A1 | 6/2017 | Steinman et al. | |
| 2017/0267065 | A1 | 9/2017 | Kim et al. | |
| 2018/0056752 | A1 * | 3/2018 | Ogawa ............... | B60H 1/00278 |

* cited by examiner

*Primary Examiner* — Allen R. B. Schult
(74) *Attorney, Agent, or Firm* — Studebaker Brackett PLLC

(57) ABSTRACT

A utility vehicle capable of off-road travelling includes a cabin, a floor panel including a floor tunnel, an air blower and a duct. The duct includes a first end part that is connected to the air blower, a second end part including an opening part open to a rear half portion of the cabin, and an extending part that extends between the first and second end parts. The extending part includes a first part extending in the front-rear direction. The whole duct is arranged above the floor tunnel.

20 Claims, 8 Drawing Sheets

UP

REAR ← → FRONT

DOWN

FRONT

UP

REAR

DOWN

VEHICLE

TECHNICAL FIELD

The present disclosure relates to a vehicle (Utility Vehicle) capable of off-road travelling.

BACKGROUND

Vehicles (Utility vehicles) for travelling on rough terrain such as a soft or uneven ground are known. For example, U.S. Pat. No. 10,988,187 B2 discloses a utility vehicle having an air conditioning unit.

SUMMARY

It is desired to provide air conditioning suitable for an off-road travelling vehicle, or more particularly, to provide high off-road travelling performance as well as high air conditioning performance.

It is accordingly a non-limiting object of the present disclosure to provide a vehicle that provides high off-road travelling performance as well as high air conditioning performance.

According to a first aspect of the present disclosure, a vehicle for travelling on rough terrain is provided. The vehicle includes a cabin, a floor panel, an air blower and a duct. The floor panel is configured to define a floor surface of the cabin. The floor panel includes a floor tunnel extending in a front-rear direction that is a length direction of the vehicle. The air blower is arranged in a front part of the vehicle. The air blower includes an outlet configured such that air is blown into the cabin. The duct is configured to guide air from the air blower to a rear half portion of the cabin. The duct includes a first end part, a second end part and an extending part. The first end part is connected to the air blower. The second end part includes an opening part open to the rear half portion of the cabin. The extending part extends between the first and second end parts. The extending part includes a first part extending in the front-rear direction. The whole duct is arranged above the floor tunnel in an up-down direction of the vehicle.

DETAILED DESCRIPTION OF THE EMBODIMENTS

First Embodiment

Figure 1:
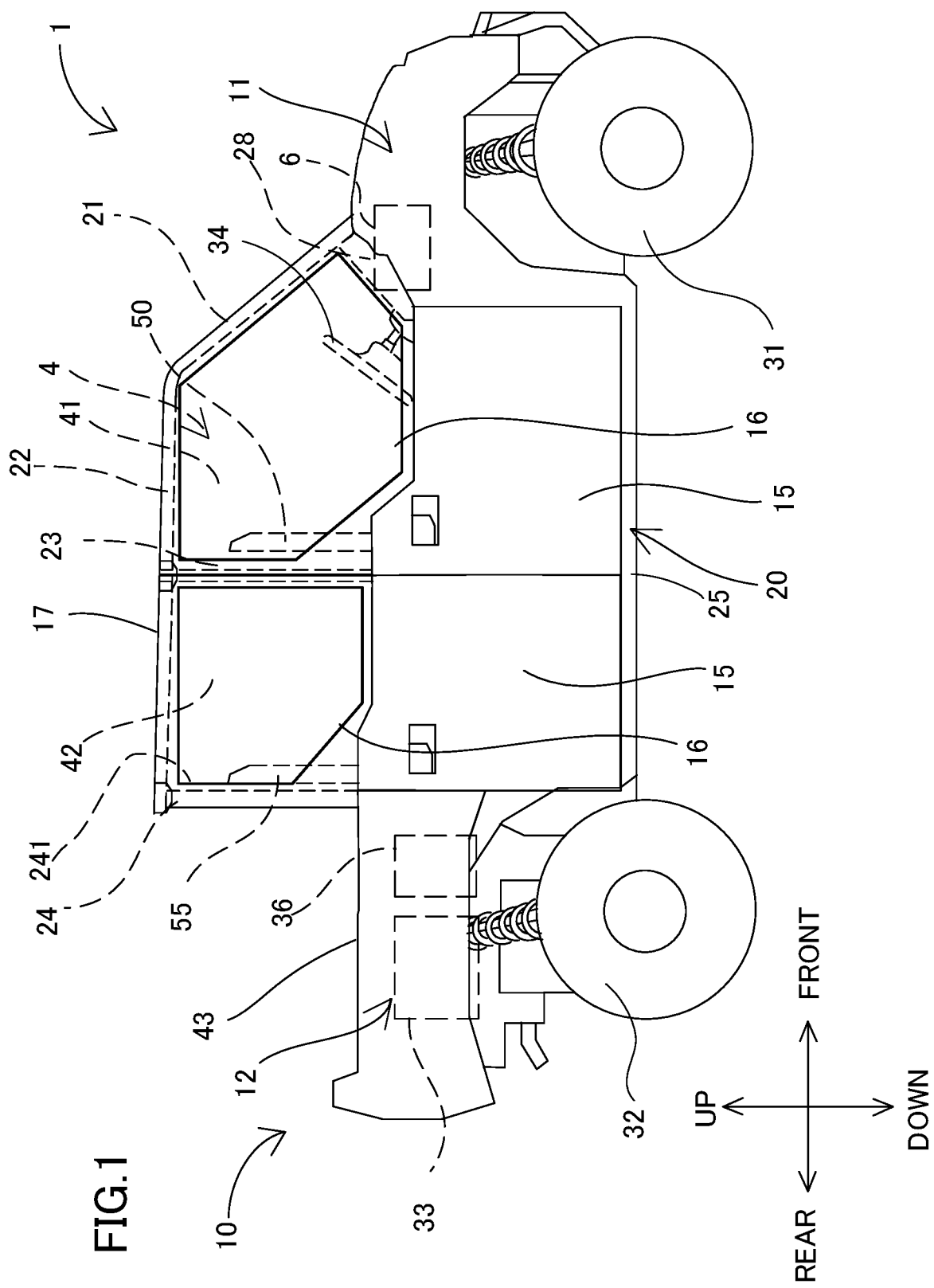
FIG. 1 is a schematic right side view of a utility vehicle according to a first embodiment of the present disclosure.

FIG. 1 is a schematic right side view of a utility vehicle 1 as a representative example of a utility vehicle according to a first embodiment of the present disclosure. Unlike a general vehicle primarily for travelling on a paved road, the utility vehicle 1 is provided primarily for travelling on off-road, such as on a dirt mountain road or forest road, mud and rocky ground as well as on grassland, gravel road and sand. In FIG. 1 and the other drawings, a front-rear direction, an up-down direction and a right-left direction of the utility vehicle 1 are appropriately shown. These directions are orthogonal to each other. The front-rear direction is also a vehicle length direction. In the front-rear direction, a direction to the front is a forward travelling direction of the utility vehicle 1, and a direction to the rear is a backward travelling direction of the utility vehicle 1. The right-left direction is also a vehicle width direction. In the up-down direction, the side of the utility vehicle 1 on which wheels are arranged is a lower side.

As shown in FIG. 1, the utility vehicle 1 includes a vehicle body 10 having a body frame 20, a pair of right and left front wheels 31 and a pair of right and left rear wheels 32, which support the vehicle body 10, an engine 33 as a power source for travelling of the utility vehicle 1, and an air blower 6. The right and left front and rear wheels 31, 32 each have a so-called low-pressure tire. The engine 33 is arranged in a rear part 12 of the vehicle body 10. The air blower 6 is arranged in a front part 11 of the vehicle body 10.

A cabin 4 is arranged between the front wheels 31 and the rear wheels 32 on the vehicle body 10 and configured as a riding space for passengers. As shown in FIG. 1, the cabin 4 is surrounded by doors 15, windows 16 and a roof 17 and so on. The doors 15, the windows 16 and the roof 17 separate the inside of the cabin 4 from the external environment of the utility vehicle 1. A front seat 50 is arranged in a front half portion 41 of the cabin 4, and a rear seat 55 is arranged in a rear half portion 42 of the cabin 4. A cargo bed 43 is arranged behind the cabin 4. The cargo bed 43 can be manually or automatically tilted rearward.

The body frame 20 is a frame structure formed of a sectioned material and serves as a skeleton of the vehicle body 10. The body frame 20 is configured to form a ROPS (rollover protective structure).

In FIG. 1, a front pillar 21, an upper pillar 22, a center pillar 23, a rear pillar 24 and a lower frame 25 are shown as parts of the body frame 20. The front pillar 21 is integrally formed with the upper pillar 22 that supports the roof 17. The front pillar 21, the upper pillar 22, the center pillar 23 and the rear pillar 24 are, for example, pipe materials made of metal. The lower frame 25 is a lowermost layer of the body frame 20 and forms a floor surface 27 of the cabin 4. The lower frame 25 is also referred to as a floor panel.

In addition to the floor panel 25, the cabin 4 is defined mainly by a front panel 28, the roof 17, a pair of right and left front pillars 21, a pair of right and left center pillars 23, a pair of right and left rear pillars 24, and a rear panel 241 that connects the right and left rear pillars 24. In this embodiment, a front wall, a rear wall, an upper wall and a lower wall of the cabin 4 are defined by the front panel 28, the rear panel 241, the roof 17 and the floor panel 25, respectively. Further, right and left walls of the cabin 4 are defined mainly by the right and left front pillars 21, the right and left center pillars 23 and the right and left rear pillars 24. More specifically, the left wall 61 of the cabin 4 is defined by the left front pillar 21, the left center pillar 23, the left rear pillar 24, and the doors 15 and the windows 16 that are arranged between these pillars. Similarly, the right wall of the cabin 4 is defined by the right front pillar 21, the right center pillar 23, the right rear pillar 24, and the doors 15 and the windows 16 that are arranged between these pillars.

Figure 2:
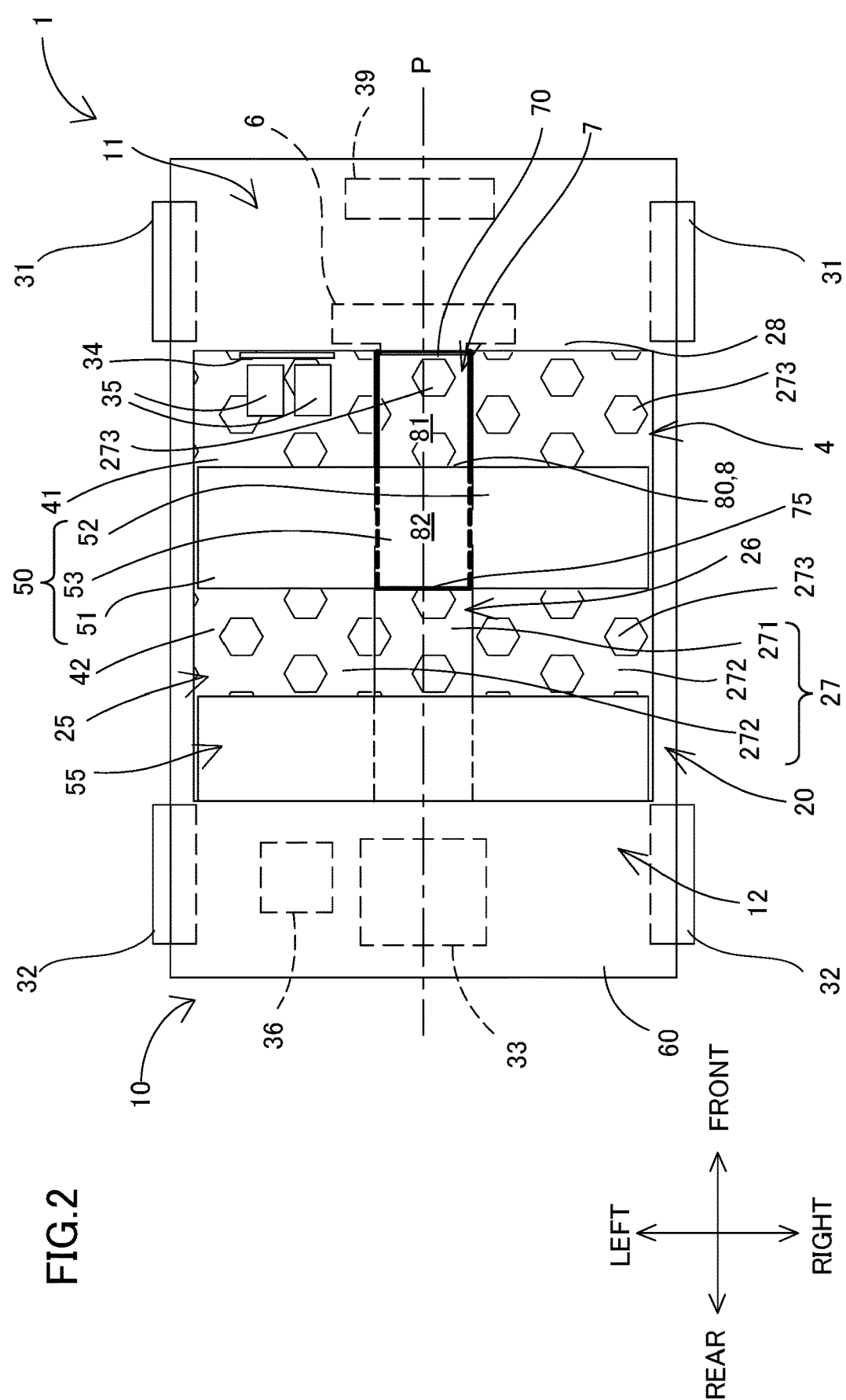
FIG. 2 is a schematic top view for illustrating arrangement of parts of the utility vehicle.

FIG. 2 is a schematic top view for illustrating arrangement of parts of the utility vehicle 1. An imaginary plane P extending in the up-down direction through the center of the vehicle body 10 in the vehicle width direction is shown in FIG. 2. The roof 17 is not shown in FIG. 2.

The front seat 50 is configured to seat three passengers side by side in the right-left direction. The front seat 50 is a so-called bench seat. The front seat 50 includes a first front seat 51, a second front seat 52 and a third front seat 53. The first front seat 51 is a part in a left region of the front seat 50 in the vehicle width direction. In front of the first front seat 51, various kinds of operating devices such as a steering wheel 34 and an operation pedal 35 are provided for a driver to operate the utility vehicle 1. The first front seat 51 is also referred to as a driver's seat. The second front seat 52 is a part in a right region of the front seat 50 in the vehicle width direction. The third front seat 53 is a part in a central region of the front seat 50 in the vehicle width direction. The third front seat 53 is provided between the first and second front seats 51, 52. Like the front seat 50, the rear seat 55 is a so-called bench seat configured to seat three passengers side by side in the right-left direction. The structure of the rear seat 55 is the same as that of the front seat 50 and is therefore not described herein.

The lower frame 25 is now described. The lower frame 25 includes a floor tunnel 26 extending in the front-rear direction. The floor tunnel 26 is arranged closer to the imaginary plane P than the operation pedal 35. In this embodiment, the floor tunnel 26 is arranged generally in the center in the vehicle width direction. The arrangement of the floor tunnel 26 generally in the center in the vehicle width direction includes that at least part of the floor tunnel 26 overlaps the imaginary plane P. Therefore, the center of the floor tunnel 26 in the vehicle width direction may or may not be located on the imaginary plane P. The floor tunnel 26 extends from the floor panel 25, which defines the front wall of the cabin 4, to a rear end of the rear seat 55. The floor tunnel 26 extends right below the third front seat 53. In this embodiment, the floor tunnel 26 is integrally formed with the lower frame 25. The floor tunnel 26 may be formed separately from the lower frame 25 and mounted on the lower frame 25. Inside the floor tunnel 26, for example, a propeller shaft for transmitting power of the engine 33 to the front wheels 31 is arranged.

A duct 7 is arranged on top of the floor tunnel 26. The duct 7 is connected to the air blower 6 and configured to guide air from the air blower 6 to the rear half portion 42 of the cabin 4. In FIG. 2, the duct 7 on the floor tunnel 26 is shown by bolder lines than the other components so as to be distinguished from the floor tunnel 26. Part of the duct 7 is arranged right below the third front seat 53 and on the floor tunnel 26 in the up-down direction. The part of the duct 7 right below the third front seat 53 is shown by bold broken lines in FIG. 2. The duct 7 is described in detail below.

The lower frame 25 defines the floor surface 27 of the cabin 4. The floor surface 27 includes an upper surface 271 of the floor tunnel 26, and side floor surfaces 272 or upper surfaces on the right and left sides of the upper surface 271 of the floor tunnel 26. The upper surface 271 is located at a level above the side floor surfaces 272.

The floor surface 27 includes a nonslip part 273. The nonslip part 273 is configured to reduce the possibility that a passenger slips on the floor surface 27. In this embodiment, the nonslip part 273 is formed by protrusions protruding upward from the floor surface 27.

The air blower 6 is configured to blow air into the cabin 4. The air blower 6 of this embodiment forms part of an air conditioning system for adjusting the temperature in the cabin 4. The air conditioning system includes a compressor 36 for compressing a refrigerant and other well-known devices such as an evaporator and a capacitor. In this embodiment, as shown in FIGS. 1 and 2, the compressor 36 is arranged in the rear part 12 of the vehicle body 10.

Figure 3:
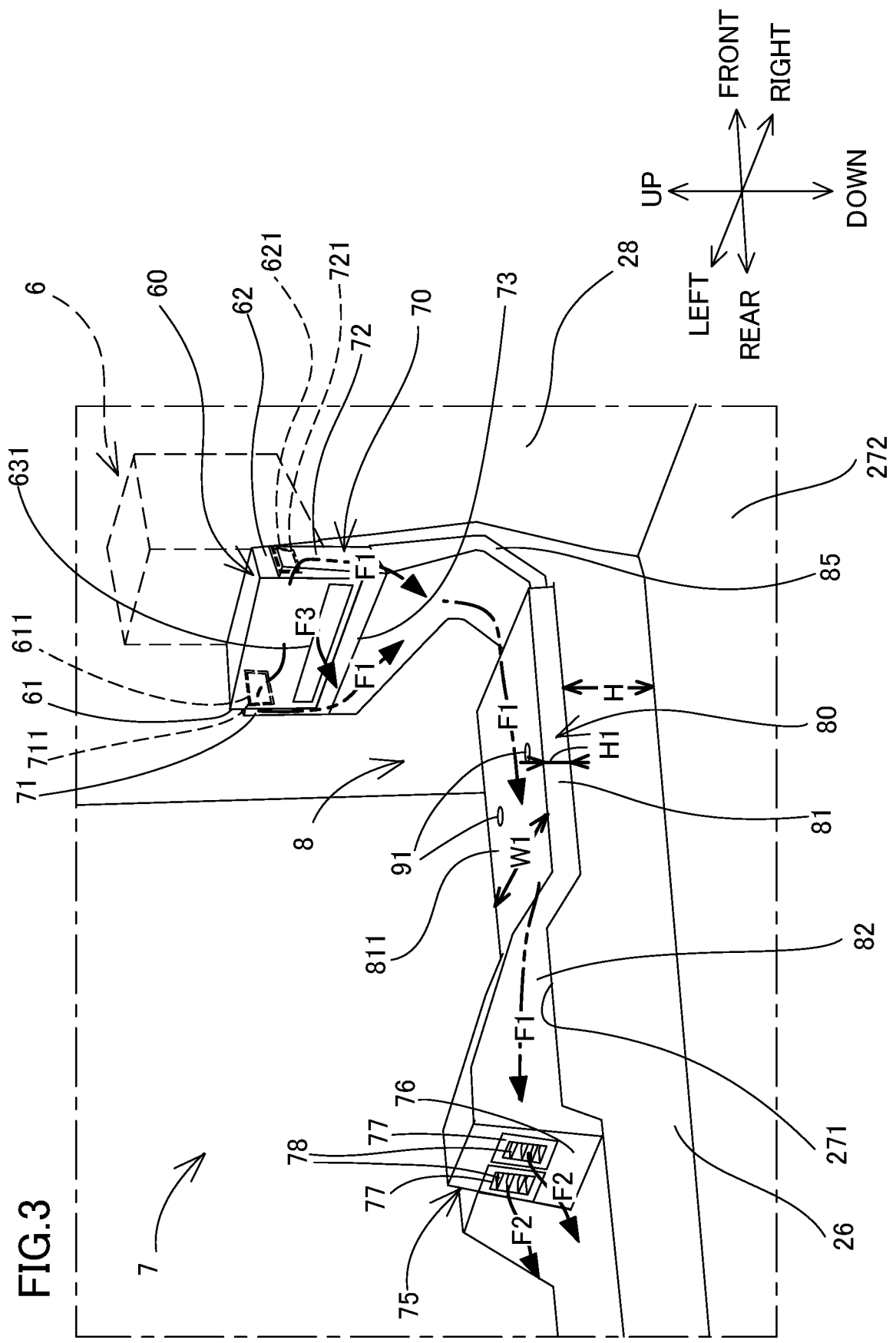
FIG. 3 is a perspective view showing an air blower and a duct in the utility vehicle.
Figure 4:
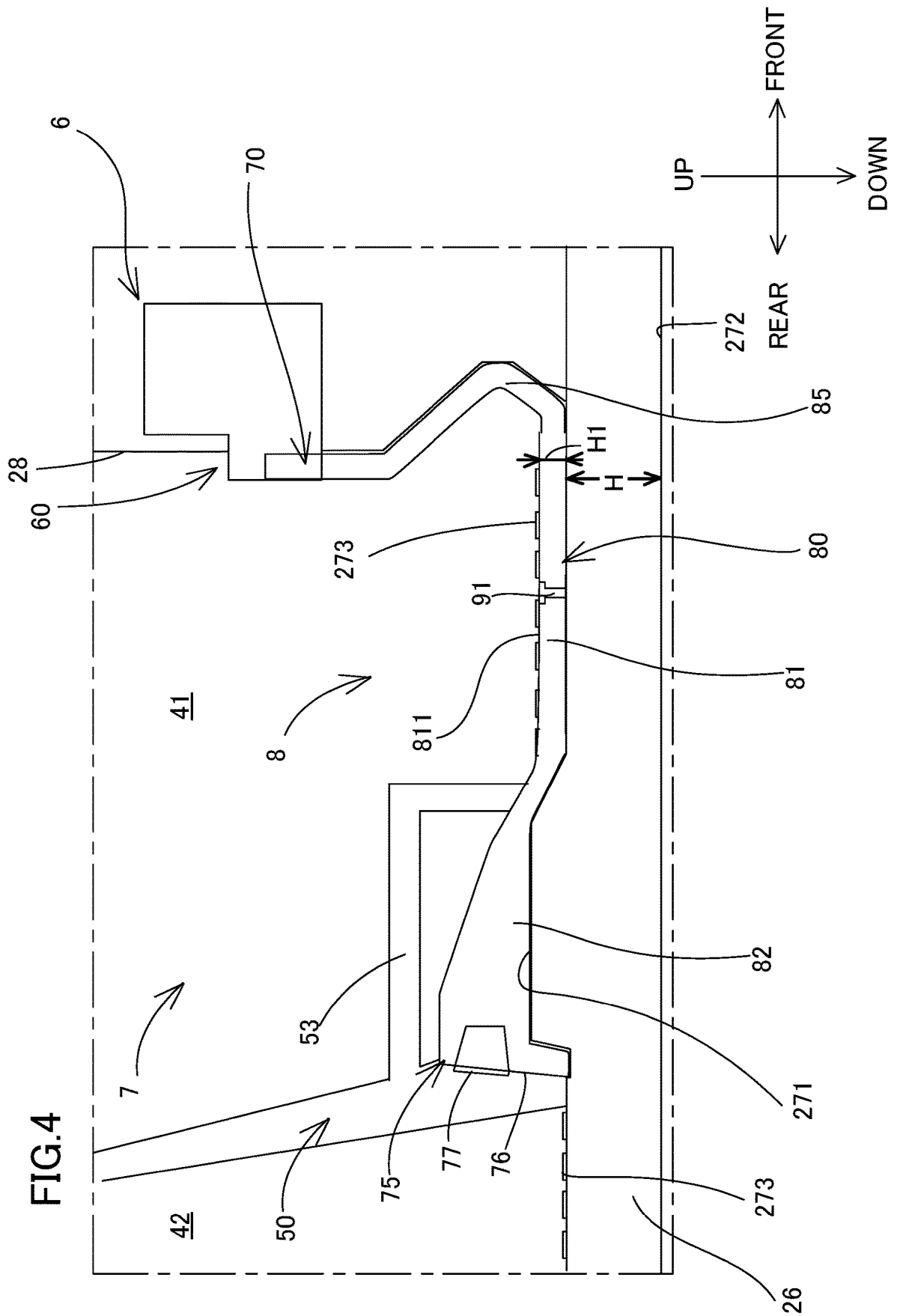
FIG. 4 is a sectional view showing the air blower and the duct, taken along an imaginary plane P.

FIG. 3 is a perspective view showing the air blower 6 and the duct 7. FIG. 4 is a sectional view showing the air blower 6 and the duct 7, taken along the imaginary plane P. The air blower 6 is now described.

As shown in FIGS. 3 and 4, most of the air blower 6 is arranged forward of the cabin 4. The air blower 6 is assembled to the front panel 28 that defines the front wall of the cabin 4, while part of a housing of the air blower 6 is exposed into the cabin 4. The part of the air blower 6 that is exposed into the cabin 4 is hereinafter also referred to as an exposed part 60.

As shown in FIG. 3, the exposed part 60 is arranged generally in the center in the vehicle width direction. The exposed part 60 includes openings 611, 621, 631 formed as outlets through which air is blown out. The openings 611 and 621 are formed in a left wall 61 and a right wall 62 of the exposed part 60, respectively. The opening 631 is formed in a central lower part of the exposed part 60. The opening 631 has a generally rectangular shape larger than the openings 611, 621. The openings 611, 621, 631 are formed above the floor panel 25 in the up-down direction. The opening 631 is provided with an adjusting mechanism (not shown). The adjusting mechanism is configured to adjust the volume and wind direction of air to be blown out from the opening 631. The adjusting mechanism includes, for example, a louver.

As shown in FIGS. 3 and 4, the duct 7 as a whole is arranged above the floor tunnel 26. In this embodiment, the whole duct 7 is arranged inside the cabin 4. It can also be said that the whole duct 7 is exposed into the cabin 4. The duct 7 is formed of metal or synthetic resin.

Figure 5:
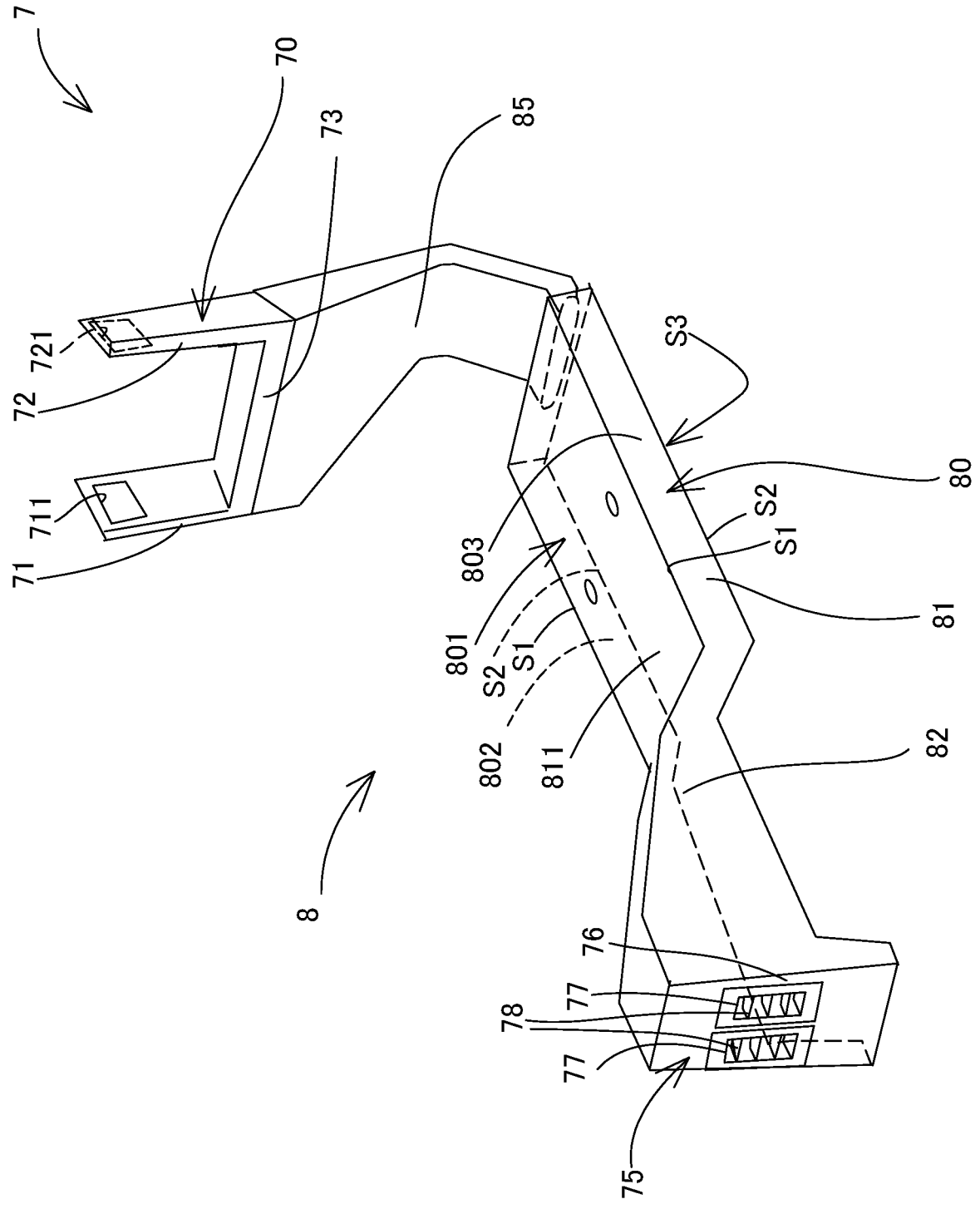
FIG. 5 is a perspective view of the duct.

FIG. 5 is a perspective view of the duct 7. As shown in FIGS. 3 to 5, the duct 7 has a first end part 70, a second end part 75 on the opposite side from the first end part 70, and an extending part 8 extending between the first and second end parts 70, 75. In this embodiment, the whole duct 7 is formed separately from the vehicle body 10 and mounted to the air blower 6.

The first end part 70 is configured to be connected to the air blower 6. In this embodiment, the first end part 70 is connected to the openings 611, 621 of the air blower 6 while the opening 631 of the air blower 6 is exposed. Specifically, the first end part 70 has a lower end part 73 extending in the right-left direction below the opening 631, a first mounting part 71 protruding upward from a left end of the lower end part 73, and a second mounting part 72 protruding upward from a right end of the lower end part 73.

The first mounting part 71 is removably mounted to the left wall 61 of the exposed part 60. The first mounting part 71 has a first opening 711. The first opening 711 is opposed to the opening 611 of the left wall 61 when the first mounting part 71 is mounted to the left wall 61. The second mounting part 72 is removably mounted to the right wall 62 of the exposed part 60. The second mounting part 72 has a second opening 721. The second opening 721 is opposed to the opening 621 of the right wall 62 when the second mounting part 72 is mounted to the right wall 62. The first and second mounting parts 71, 72 can be mounted to the air blower 6 in any well-known manner if the first end part 70 is configured to be removable from the air blower 6. For example, the first mounting part 71 may have a locking projection that is configured to pinch the left wall 61 in the front-rear direction so as to lock the first mounting part 71 to the left wall 61. Alternatively, the first mounting part 71 may be configured to be mounted to the left wall 61 with a screw. Similarly, the second mounting part 72 may have a locking projection that is configured to pinch the right wall 62 in the front-rear direction so as to lock the second mounting part 72 to the right wall 62. Alternatively, the second mounting part 72 may be configured to be mounted to the right wall 62 with a screw.

The extending part 8 is a part of the duct 7 that extends between the first and second end parts 70, 75. As shown in FIGS. 3 to 5, the extending part 8 includes a first part 80 and a second part 85 formed on the front side of the first part 80. As shown in FIGS. 2 to 4, the first part 80 is placed on top of the floor tunnel 26 and extends in the front-rear direction. As shown in FIG. 4, the first part 80 is fixed to the upper surface 271 of the floor tunnel 26 with screws 91. The second part 85 is a tubular part that connects the lower end part 73 of the first end part 70 and the first part 80. The second part 85 is formed to conform to the shape of the front panel 28. The second part 85 has a flat shape having a shorter length in the longitudinal direction than in the right-left direction.

The first part 80 is now described in further detail. The first part 80 includes a first front part 81 and a first rear part 82 extending rearward from the first front part 81. As shown in FIG. 2, the first front part 81 is a part of the first part 80 that extends from a front end of the cabin 4 to a front end of the front seat 50. The first front part 81 is located under feet of a passenger on the third front seat 53. The first rear part 82 is a part of the first part 80 that extends from the front end of the front seat 50 close to a rear end of the front seat 50. In this embodiment, the first front part 81 and the first rear part 82 are arranged within the width of the floor tunnel 26 in the right-left direction.

As shown in FIGS. 3 and 4, the first front part 81 has an upper surface 811 generally parallel to the floor surface 27. As shown in FIG. 4, like the floor surface 27, the upper surface 811 has a nonslip part 273. In the drawings other than FIGS. 2 and 4, the nonslip part 273 is not shown.

In FIG. 3, a width W1 of the first front part 81 in the right-left direction and a height H1 of the first front part 81 in the up-down direction are shown. The width W1 is generally equal to a width in the right-left direction of a part of the floor tunnel 26 that extends from the front end of the cabin 4 to the front end of the front seat 50. The height H1 is smaller than the width H1. The first front part 81 is formed in a flat shape. The first front part 81 is also referred to as a flat part. Further, in FIGS. 3 and 4, a height H of the floor tunnel 26 in the up-down direction is shown. The height H of the floor tunnel 26 corresponds to the distance between the side floor surfaces 272 and the upper surface 271 of the floor tunnel 26 in the up-down direction. The height H1 of the flat part 81 is smaller than the height H of the floor tunnel 26. The height H1 of the flat part 81 is, for example, about a quarter of the height H of the floor tunnel 26.

As shown in FIGS. 2 and 4, the first rear part 82 is located right below the third front seat 53. It can also be said that the first rear part 82 is arranged between the first and second front seats 51, 52. The arrangement of the first rear part 82 right below the third front seat 53 means that the first rear part 82 overlaps the third front seat 53 in plan view as shown in FIG. 2. As shown in FIGS. 3 and 4, the first rear part 82 is formed to have a height increasing toward the rear in the up-down direction. The first rear part 82 is also referred to as an enlarged diameter part. The first rear part 82 has a cross section increasing from the connection with the first front part 81 toward the second end part 75.

Figure 6:
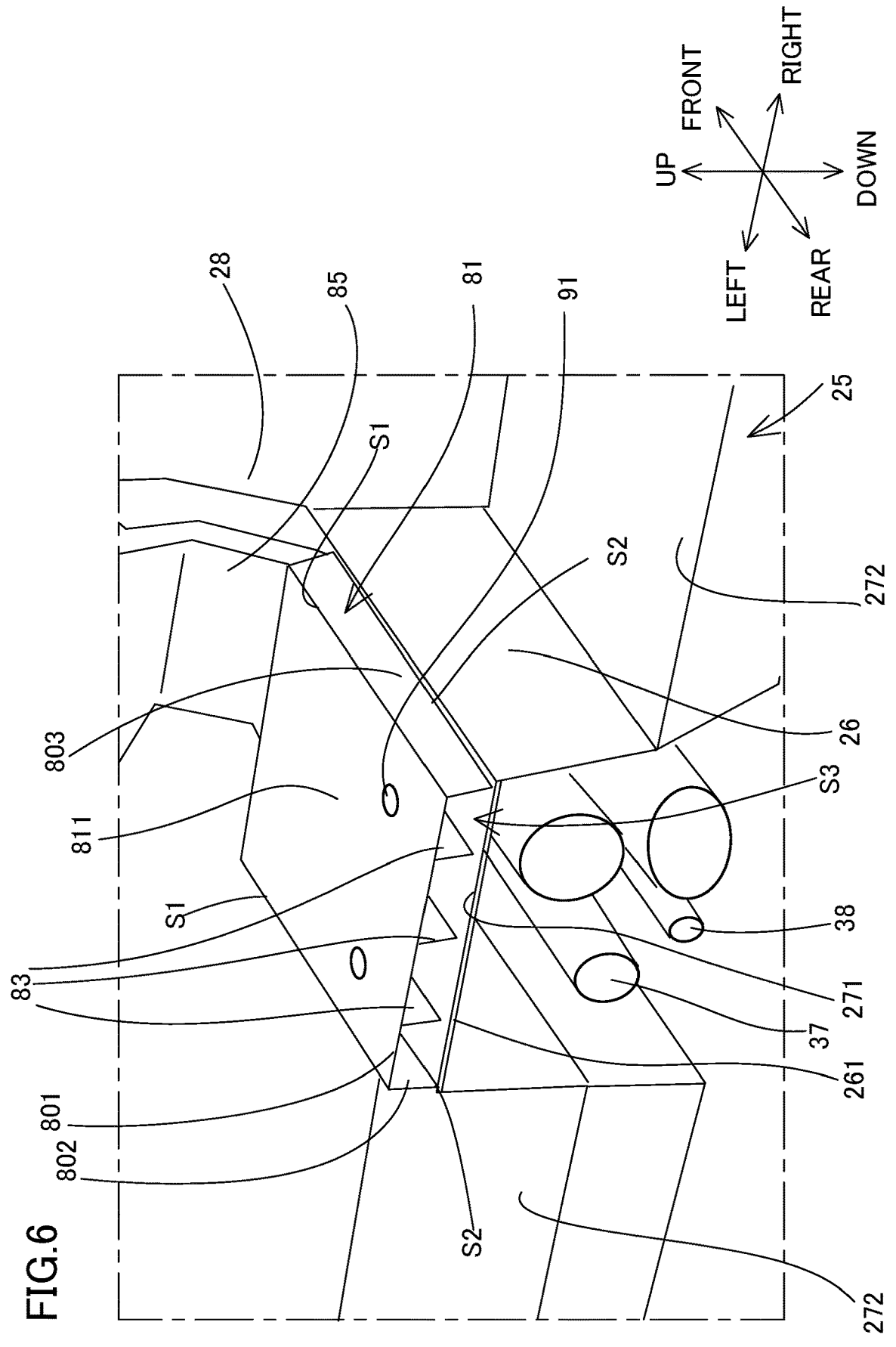
FIG. 6 is a cross sectional view showing a first part.

The inner structure of the first part 80 is now described. In FIG. 6, the first part 80 is shown in cross section. As shown in FIGS. 5 and 6, the first part 80 has a pair of side walls 802, 803 extending in the up-down direction and an upper wall 801 connected to upper ends S1 of the side walls 802, 803. The first part 80 is open at a bottom part S3 opposed to the upper wall 801. In other words, the first part 80 does not have a lower wall. As shown in FIG. 6, lower ends S2 of the side walls 802, 803 abut the upper surface 271 of the floor tunnel 26. The upper wall 261 of the floor tunnel 26 is opposed to the upper wall 801 of the first part 80 when the first part 80 is fixed to the floor tunnel 26. Thus, the upper wall 261 of the floor tunnel 26 serves as a lower wall of the first part 80.

A reinforcing wall 83 is provided inside the first front part 81. In this embodiment, reinforcing walls 83 are arranged spaced apart in the right-left direction inside the first front part 81. Each of the reinforcing walls 83 is connected to the upper wall 801 and extends in the up-down direction. The reinforcing wall 83 is generally parallel to the side walls 802, 803. A lower end of the reinforcing wall 83 abuts the upper wall 261 of the floor tunnel 26. The reinforcing wall 83 is formed, for example, of metal or synthetic resin. FIG. 6 further shows the propeller shaft 37 and pipes including a refrigerant pipe 38, which extend in the front-rear direction within the floor tunnel 26. The propeller shaft 37 transmits power of the engine 33 to the right and left front wheels 31. The refrigerant pipe 38 is connected between the compressor 36 arranged in the rear part 12 of the vehicle body 10 and the air blower 6.

Referring to FIGS. 3 to 5 again, the second end part 75 is now described. The second end part 75 on the rear end of the extending part 81 defines a rear end of the duct 7. The second end part 75 has a rear wall 76 extending in the up-down direction and opening parts 77 formed in the rear wall 76. Each of the opening parts 77 has an adjusting mechanism 78. Like the adjusting mechanism of the opening 631, the adjusting mechanism 78 is configured to adjust the volume and wind direction of air to be blown out from the opening part 77.

It is described how air flows when the duct 7 having the above-described structure is mounted to the air blower 6 and the air blower 6 is driven. In FIG. 3, air flow within the duct 7 is shown by arrow F1, and air flow within the cabin 4 is shown by arrows F2, F3. As shown by arrow F1 in FIG. 3, air blown out from the opening 611 of the exposed part 60 passes through the inside of the first mounting part 71 and flows toward the first front part 81 via the second part 85. Similarly, air blown out from the opening 621 of the exposed part 60 passes through the inside of the second mounting part 72 and flows toward the first front part 81 via the second part 85. Air flowing through the first front part 81 spreads in the up-down direction in the enlarged diameter part 82, and is blown out to the rear half portion 42 of the cabin 4 through the opening parts 77 of the second end part 75 as shown by arrow F2.

The opening 631 of the exposed part 60 is not covered by the first end part 70. Therefore, air blown out from the opening 631 spreads to the center of the front half portion 41 of the cabin 4 as shown by arrow F3 in FIG. 3. Where the duct 7 is not attached to the air blower 6, air blown out from the opening 611 mainly flows toward the first front seat 51, and air blown out from the opening 621 mainly flows toward the second front seat 52.

Effects of the first embodiment are now described.

The duct 7 has the first end part 70 connected to the air blower 6, the second end part 75 having the opening parts 77 open to the rear half portion 42 of the cabin 4, and the extending part 8, and the duct 7 guides air from the air blower 6 to the rear half portion 42 of the cabin 4. Therefore, in the utility vehicle 1 according to the first embodiment, the environment of the rear half portion 42 of the cabin 4 can be improved.

Generally, the environment under the floor panel 25 is subject to exhaust heat from other parts such as a radiator 39 (see FIG. 2) arranged in the front part 11 of the vehicle body 10. According to the first embodiment, however, the whole duct 7 is arranged above the floor panel 25 in the up-down direction, so that temperature rise within the duct 7 by exhaust heat from other parts is suppressed. Thus, according to the first embodiment, the air conditioning performance of the utility vehicle 1 can be improved.

Further, the environment under the floor panel 25 is easily affected by foreign matters such as mud splashed up by the front wheels 31 during off-road travelling of the utility vehicle 1 or by obstacles on a road surface. According to the first embodiment, however, the whole duct 7 is arranged above the floor tunnel 26 in the up-down direction, so that the duct 7 is protected from such foreign matters and obstacles by the floor panel 25 including the floor tunnel 26. Off-road travelling (travelling on rough terrain) of the utility vehicle 1 includes crossing rivers and passing muddy areas. In the utility vehicle 1 according to this embodiment, entry of liquid into the duct 7 is reduced even in such off-road travelling, compared with a structure having a duct under the floor panel 25.

With the structure having the duct 7 above the floor panel 25, the number of parts arranged under the floor panel 25 is also reduced. Thus, a ground clearance, or a distance between a road surface and a part located at the lowest level among main components of the utility vehicle 1, is secured, so that the off-road travelling performance of the utility vehicle 1 is improved.

The whole duct 7 is arranged inside the cabin 4. The environment inside the cabin 4 is cleaner than the outside of the cabin 4. Thus, according to the first embodiment, the environment inside the cabin 4 is improved, and the duct 7 is facilitated in maintenance and has a longer life.

The first end part 70 has the first and second mounting parts 71, 72 removably mounted to the air blower 6. Thus, the duct 7 can be attached to the vehicle body 10 according to user's desire (needs) for the environmental comfort of the rear half portion 42 of the cabin 4. In other words, a user or a manufacturer can additionally attach the duct 7 to the vehicle body 10 of the utility vehicle 1. Thus, the vehicle body 10 can be standardized in case that utility vehicles are manufactured.

The extending part 8 includes the first part 80 extending in the front-rear direction, and the second part 85 formed on the front side of the first part 80. The first part 80 is fixed to the upper surface 271 of the floor tunnel 26. Thus, the possibility that the first part 80 obstructs movement of a passenger in the front half portion 41 is reduced.

The second part 85 is formed along the front panel 28 and connects the first end part 70 and the first part 80. Thus, the extending part 8 as a whole is arranged along the front panel 28 and the floor tunnel 26. Therefore, in a structure in which the extending part 8 is arranged within the cabin 4, the space of the front half portion 41 of the cabin 4 is secured.

The front part 81 of the first part 80 on the floor tunnel 26 is formed in a flat shape having the height H1 in the up-down direction that is smaller than the width H1. Thus, the space in the first part 80 can be enlarged while the height H1 of the first part 80 is reduced. This allows air to sufficiently flow toward the second end part 75, while reducing the possibility of reducing passenger's ease of getting on and off.

The rear part 82 of the first part 80 is an enlarged diameter part having a cross section increasing toward the second end part 75. Thus, air blown out from the opening parts 77 of the second end part 75 easily spreads to the rear half portion 42 of the cabin 4. Further, compared with a structure in which the first part 80 has a constant cross section up to the second end part 75, the wind speed of air blown out from the opening parts 77 is reduced. This reduces the possibility that relatively strong air flow is blown to a passenger in the rear half portion 42 of the cabin 4.

In the first embodiment, the first part 80 is fixed to the floor tunnel 26, and the upper wall 261 of the floor tunnel 26 serves as a lower wall of the first part 80. Therefore, compared with a structure in which the first part 80 has a lower wall, the duct 7 can be reduced in weight.

The upper surface 811 of the first front part 81 is generally parallel to the floor surface 27. The upper surface 811 as well as the floor surface 27 has the nonslip part 273. This reduces the possibility that a passenger's foot slips on the first front part 81. Therefore, a passenger can treat (or consider) the first front part 81 as part of the floor surface 27 of the cabin 4.

The reinforcing wall 83 is provided inside the first part 80. Thus, the rigidity of the first part 80 is enhanced, so that a passenger can apply his or her weight onto the first part 80 and treat the first part 80 as part of the floor surface 27 of the cabin 4.

Other embodiments in which the duct 7 is arranged above the floor tunnel 26 like in the utility vehicle 1 of the first embodiment are now described.

Second Embodiment

Figure 7:
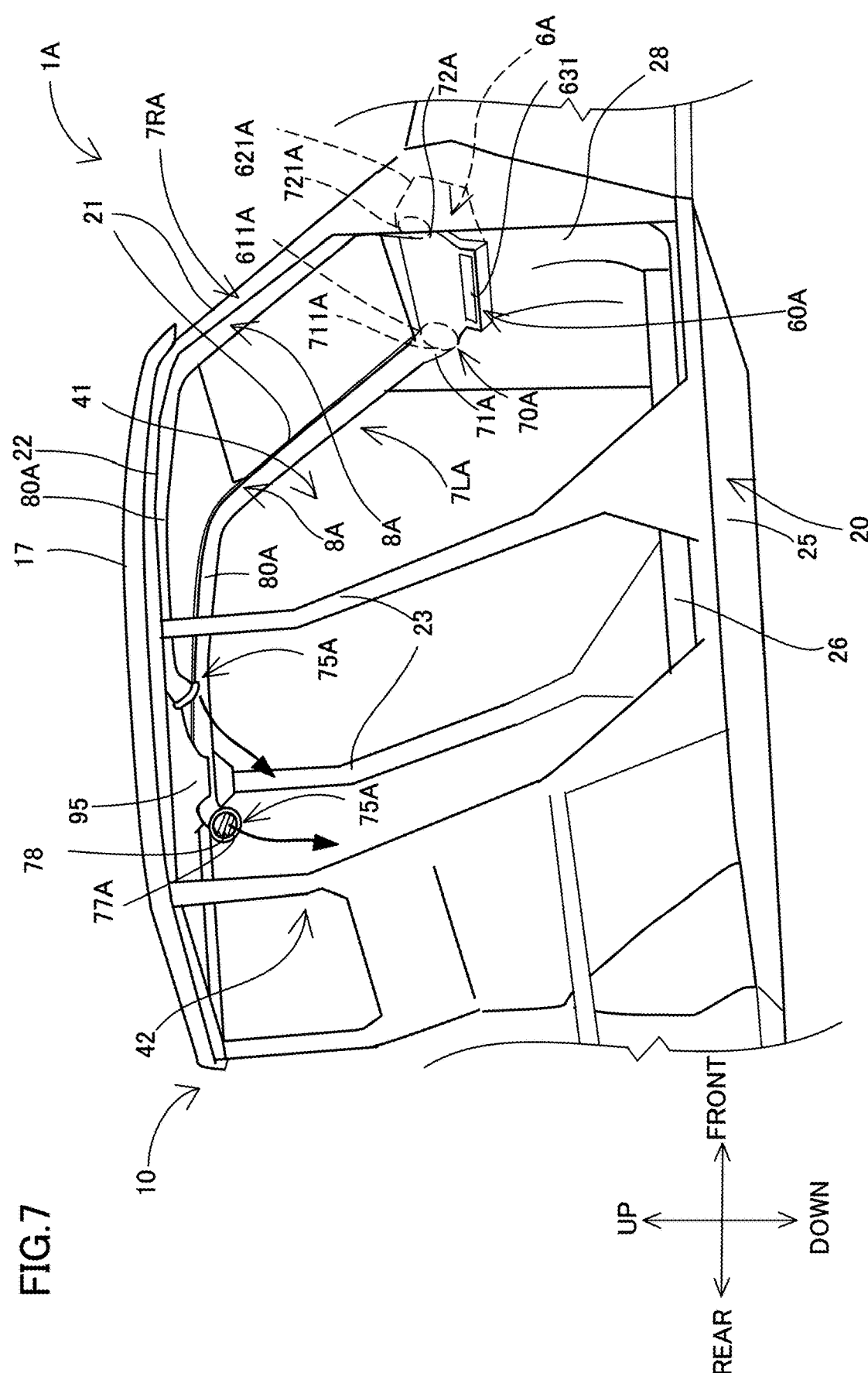
FIG. 7 is a partial, perspective view, showing a utility vehicle according to a second embodiment of the present disclosure, for illustrating ducts.

In the following description, components or structures which are substantially identical to those of the above-described first embodiment are given the same numerals as in the first embodiment and are not described and shown in detail. FIG. 7 is a perspective view showing a body frame 20, an air blower 6A and ducts 7LA, 7RA of a utility vehicle 1A according to a second embodiment of the present disclosure. The air blower 6A includes openings 611A, 621A, 631 formed as outlets through which air is blown. The openings 611A and 621A are formed in left and right parts of the front panel 28, respectively. The opening 631 is formed in a central lower part of an exposed part 60A of the air blower 6A.

The utility vehicle 1A has the left duct 7LA and the right duct 7RA respectively formed on the left and right sides of the vehicle body 10. Where the left duct 7LA is not attached to the air blower 6A, air blown out from the opening 611A mainly flows toward the first front seat 51, although the front seat 50 is not shown in FIG. 7. Where the right duct 7RA is not attached to the air blower 6A, air blown out from the opening 621A mainly flows toward the second front seat 52.

The left duct 7LA has a first end part 70A connected to the opening 611A, a second end part 75A and an extending part 8A. The first end part 70A includes a first mounting part 71A removably mounted to a periphery of the opening 611A of the air blower 6A. The first mounting part 71A has a first opening 711A. The first opening 711A is opposed to the opening 611A of the air blower 6A.

The extending part 8A extends along the front pillar 21 and the upper pillar 22. The extending part 8A has a tubular shape and includes a first part 80A extending in the front-rear direction along the upper pillar 22. The first part 80A extends rearward of the center pillar 23. A rear end part of the first part 80A is removably fixed to the vehicle body 10 by a fixing part 95 provided on top of the center pillar 23.

The second end part 75A is arranged generally in the same position as or rearward of the center pillar 23 in the front-rear direction. The second end part 75A has an opening part 77A open to the rear half portion 42 of the cabin 4.

The right duct 7RA has the same structure as the left duct 7LA and is arranged symmetrically with the left duct 7LA in the right-left direction. The right duct 7RA has a first end part 70A connected to the opening 621A, a second end part 75A and an extending part 8A. The first end part 70A includes a second mounting part 72A removably mounted to a periphery of the opening 621A of the air blower 6A. The second mounting part 72A has a second opening 721A. The second opening 721A is opposed to the opening 621A of the air blower 6A. The structures of the extending part 8A and the second end part 75A of the right duct 7RA are the same as those of the left duct 7LA and are therefore not described.

According to the second embodiment, the whole ducts 7LA, 7RA are arranged above the floor tunnel 26. Thus, like in the first embodiment, the ducts 7LA, 7RA are prevented from being affected by exhaust heat and foreign matters. Therefore, the utility vehicle 1A is provided with the ducts 7LA, 7RA arranged and configured to be suitable for off-road travelling. In other words, according to the second embodiment, like in the first embodiment, the utility vehicle 1A is provided both with high off-road travelling performance and high air conditioning performance.

The whole ducts 7LA, 7RA are exposed into the cabin 4. Thus, the environment inside the cabin 4 is improved, and the ducts 7LA, 7RA are facilitated in maintenance and have a longer life.

The extending parts 8A are arranged along the front pillars 21 and the upper pillars 22 for supporting the roof 17, which form part of the ROPS, while being supported with the front pillars 21 and the upper pillars 22 as supports. Thus, in the structure in which the ducts 7LA, 7RA are arranged in the cabin 4, the space in the cabin 4 is secured.

Third Embodiment

Figure 8:
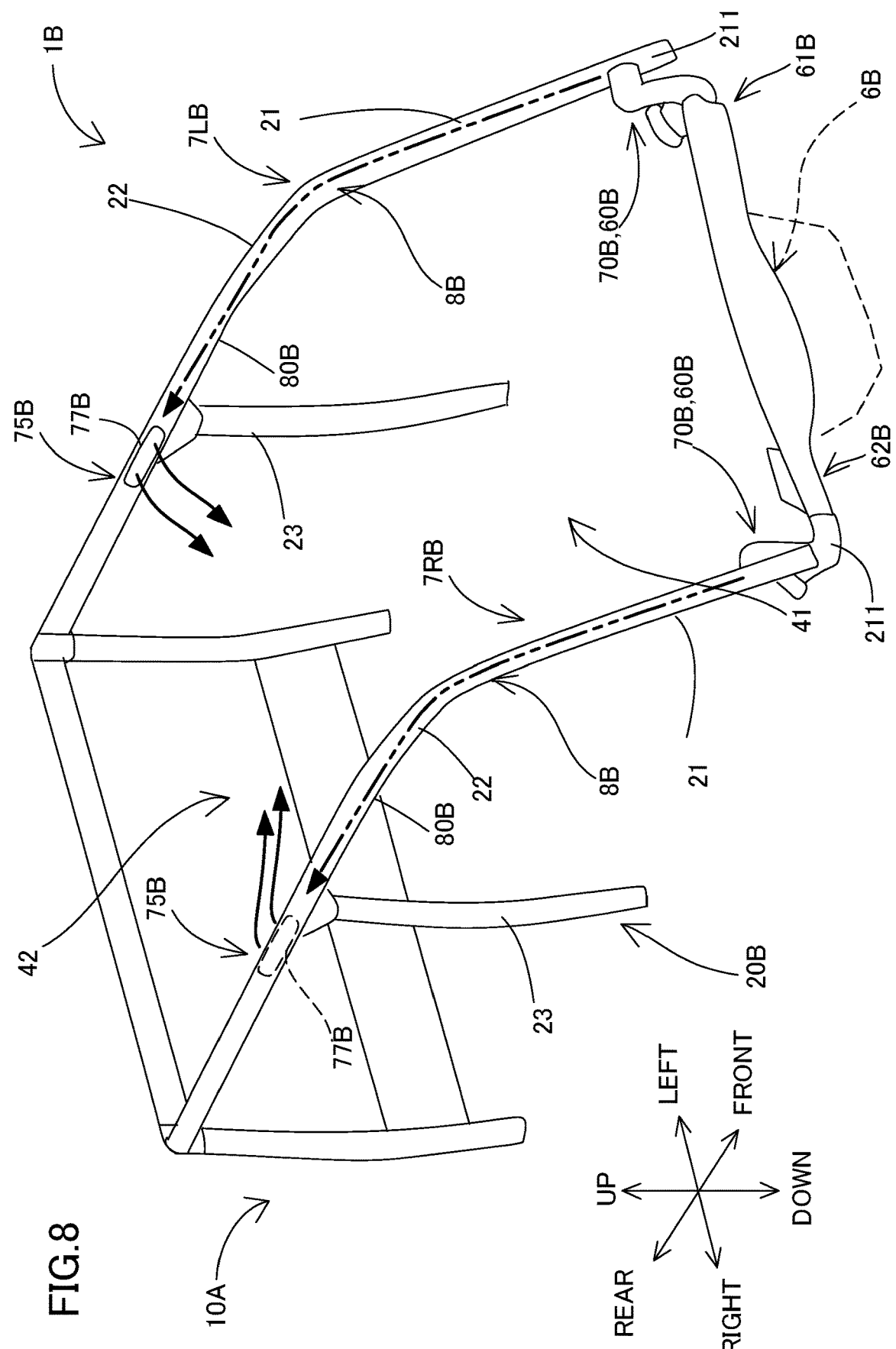
FIG. 8 is a partial, perspective view, showing a utility vehicle according to a third embodiment of the present disclosure, for illustrating ducts.

FIG. 8 is a perspective view showing a body frame 20B, an air blower 6B and ducts 7LB, 7RB of a utility vehicle 1B according to a third embodiment of the present disclosure. The front pillar 21 and the upper pillar 22 form an extending part 8B and a second end part 75B of the third embodiment.

Referring to a left part of the utility vehicle 1B, a connecting part 70B connects a front end 211 of the front pillar 21 and a left part 61B of the air blower 6B. The connecting part 70B is a member for communicating the air blower 6B with the inside of the front pillar 21. The front pillar 21 and the upper pillar 22 are formed in a tubular shape to communicate with each other in the inside. The upper pillar 22 has an opening 77B formed rearward of the center pillar 23 in the front-rear direction and open to the rear half portion 42.

Air blown out from the left part 61B of the air blower 6B flows into the left front pillar 21 through the connecting part 70B. The air in the left front pillar 21 flows into the left upper pillar 22 and is blown out from the opening 77B.

Thus, in the third embodiment, the connecting part 70B serves as a first end part 70B of the duct 7LB. The front pillar 21 and part of the upper pillar 22 serve as the extending part 8B of the duct 7LB. The upper pillar 22 extending in the front-rear direction corresponds to the first part 80B. Part of the upper pillar 22 in which the opening 77B is formed serves as the second end part 75B of the duct 7LB.

Referring to a right part of the utility vehicle 1B, a connecting part 70B connects a front end 211 of the front pillar 21 and a right part 62B of the air blower 6B. Air blown out from the right part 62B flows into the right front pillar 21 through the connecting part 70B. The right duct 7RB as a whole has the same structure as the left duct 7LB and is arranged symmetrically with the left duct 7LB in the right-left direction, and is therefore not described.

According to the third embodiment, the whole ducts 7LB, 7RB are arranged above the floor tunnel 26. Thus, like in the first and second embodiments, the ducts 7LB, 7RB are prevented from being affected by exhaust heat and foreign matters. Therefore, the utility vehicle 1B is provided with the ducts 7LB, 7RB arranged and configured to be suitable for off-road travelling. In other words, according to the third embodiment, like in the first and second embodiments, the utility vehicle 1B is provided both with high off-road travelling performance and high air conditioning performance.

The front pillars 21 and the upper pillars 22 that form part of the ROPS serve as the extending parts 8B of the ducts 7LA, 7LB. Thus, the space in the cabin 4 is sufficiently secured. Further, the costs for separately manufacturing a duct are reduced or eliminated.

<Other Embodiments>

In the above-described embodiments, the front seat 50 is configured to seat three passengers side by side in the right-left direction. The front seat 50 however need not have the third front seat 53, and the first and second front seats 51, 52 may be separately formed. The extending part 8 may extend in the front-rear direction between the first and second front seats 51, 52. According to this embodiment, the same effect as in the first embodiment is also obtained.

In the first embodiment, the whole first part 80 may be formed in a flat shape. Further, in the first embodiment, the first part 80 may have a lower wall opposed to the upper wall 801.

The nonslip part 273 of the floor surface 27 is not limited to that of the above-described embodiments, but it may be configured by forming recesses in the floor surface 27. From the viewpoint of reducing the possibility that a passenger slips on the floor surface 27, the nonslip part 273 may just be formed at least in the first front part 81 of the duct 7.

The utility vehicle 1A of the second embodiment and the utility vehicle 1B of the third embodiment need not have the floor tunnel 26. In the utility vehicles 1A, 1B, air is guided from the air blower 6, 6B to the rear half portion 42 of the cabin 4 by utilizing the front pillars 21 and the upper pillars 22 that form part of the ROPS. Further, the extending parts 8A, 8B of the ducts 7LA and 7RA, 7LB and 7RB and the second end part 75A, 75B are exposed into the cabin 4. Therefore, according to this embodiment, the ducts 7LA, 7RA, 7LB, 7RB are prevented from being affected by exhaust heat and foreign matters.

In the second and third embodiments, insofar as the ROPS is used and the second end part 75A, 75B has the opening part 77A, 77B open to the rear half portion 42 of the cabin 4, the structure of the second end part 75A, 75B may be appropriately changed. For example, the opening part 77A, 77B of the second end part 75A, 75B may be arranged generally in the same position as the center pillar 23 in the front-rear direction.

The air blower 6, 6A, 6B of the above-described embodiments forms a part of the air conditioning system capable of air-conditioning the cabin 4. The air blower 6, 6A, 6B may however be a device simply for blowing air. The shape of the air blower 6, 6A, 6B and the shape, arrangement and number of the outlets may be appropriately changed. The shape of the first end part 70, 70A, 70B of the duct 7, 7LA, 7RA, 7LB, 7RB may be appropriately changed according to (the change of) the air blower.

The present disclosure is not limited to the above-described embodiments, but rather, may be embodied in various other aspects without departing from the spirit and scope of the present disclosure. For example, the present disclosure can also be embodied in the following aspects. The technical features of the above-described embodiments corresponding to the technical features of the following aspects can be appropriately replaced or combined with each other in order to realize part or the whole of the object of the present disclosure or to realize part or all of the effects of the present disclosure. Further, the technical features can be appropriately deleted unless described as essential in the specification of the present disclosure.

<1> According to a first aspect of the present disclosure, a vehicle for travelling on rough terrain is provided. The vehicle has a cabin, a floor panel, an air blower and a duct. The floor panel is configured to define a floor surface of the cabin. The floor panel has a floor tunnel extending in a front-rear direction that is a length direction of the vehicle. The air blower is arranged in a front part of the vehicle. The air blower has an outlet configured such that air is blown into the cabin. The duct is configured to guide air from the air blower to a rear half portion of the cabin. The duct has a first end part, a second end part and an extending part. The first end part is connected to the air blower. The second end part has an opening part open to the rear half portion of the cabin. The extending part extends between the first and second end parts. The extending part includes a first part extending in the front-rear direction. The whole duct is arranged above the floor tunnel in an up-down direction of the vehicle.

According to this aspect, by provision of the duct that has the first end part connected to the air blower, the second end part having the opening part open to the rear half portion of the cabin, and the extending part extending between the first and second end parts, air blown out from the air blower is guided to the rear half portion of the cabin. Thus, the environment of the rear half portion of the cabin is improved. Further, by the arrangement of the duct above the floor tunnel, the duct is prevented from being affected by exhaust heat from other parts or by foreign matters such as mud splashed from front wheels of the vehicle during off-road travelling. Further, compared with a structure having a duct under the floor panel, the number of parts arranged under the floor panel is reduced, so that a ground clearance is secured. Therefore, the vehicle is provided with the duct having an arrangement structure suitable for off-road travelling. In other words, the vehicle is provided both with high off-road travelling performance and high air conditioning performance.

In this aspect, the cabin may be defined mainly by the floor panel, a front panel, a roof, a pair of right and left front pillars, a pair of right and left center pillars, a pair of right and left rear pillars, and a rear panel connected to the right and left rear pillars.

Further, in this aspect, the vehicle may have a ROPS (rollover protective structure).

Wheels of the vehicle may have a low-pressure tire.

<2> In the above-described aspect, the extending part and the second end part may be exposed into the cabin.

According to this aspect, at least the extending part and the second end part are arranged under a cleaner environment.

<3> In the above-described aspect, the whole duct may be exposed into the cabin.

According to this aspect, the whole duct is arranged under a cleaner environment.

<4> In the above-described aspect, the first part may be placed on an upper surface of the floor tunnel.

According to this aspect, the possibility that the extending part obstructs movement of a passenger in the front half portion of the cabin is reduced.

The placement of the first part on the upper surface of the floor tunnel may include that the first part contacts the upper surface of the floor tunnel. The first part may be fixed to the floor tunnel by using a general fixing method such as screwing and locking by a locking piece.

<5> In the above-described aspect, the first part may be arranged in the center of the vehicle in a width direction of the vehicle.

According to this aspect, the first part is arranged in a part of the front half portion of the cabin that relatively little affects passenger's ease of getting on and off.

<6> In the above-described aspect, the vehicle may have a front seat part that is arranged in a front half portion of the cabin and includes first and second front seats spaced apart from each other in a width direction of the vehicle. The first part may be arranged between the first and second front seats in the vehicle width direction.

According to this aspect, the possibility that the first part obstructs movement of a passenger in the front half portion of the cabin is reduced.

<7> In the above-described aspect, the vehicle may have an operation pedal that is arranged in a front half portion of the cabin and provided to be operated to travel the vehicle. The first part may be arranged closer to the center in a width direction of the vehicle than the operation pedal and extend in the front-rear direction.

According to this aspect, the possibility that the first part obstructs movement of a passenger in the front half portion of the cabin is reduced.

<8> In the above-described aspect, the extending part may include a second part that connects the first end part and the first part and is formed along a front panel that defines a front wall of the cabin.

According to this aspect, in a structure in which the extending part is arranged within the cabin, the space of the front half portion of the cabin is secured.

<9> In the above-described aspect, the first part may have an enlarged diameter part formed to have a cross section orthogonal to the front-rear direction that increases toward the second end part.

According to this aspect, compared with a structure in which the first part has a constant cross section up to the second end part, the wind speed of air blown out from the opening part is reduced. This reduces the possibility that strong air flow is blown to a passenger.

<10> In the above-described aspect, the vehicle may have a front seat part that is arranged in a front half portion of the cabin and includes first and second front seats spaced apart from each other in a width direction of the vehicle and a third front seat provided between the first and second front seats. The enlarged diameter part may overlap the third front seat in plan view.

According to this aspect, the structure in which the first part has the enlarged diameter part effectively reduces the possibility of reducing passenger's ease of getting on and off.

<11> In the above-described aspect, the first part may have a flat part having a height in the up-down direction that is smaller than a width in a width direction of the vehicle.

According to this aspect, the space in the duct can be enlarged while the height of the first part is reduced. This reduces the possibility that air stays in the duct, while reducing the possibility of reducing passenger's ease of getting on and off.

<12> In the above-described aspect, at least part of the flat part may be arranged forward of the front seat part.

According to this aspect, the structure in which the first part is arranged on the floor tunnel reduces the possibility of reducing passenger's ease of getting on and off.

<13> In the above-described aspect, the first part may have a reinforcing wall provided inside the first part and extending in the up-down direction.

According to this aspect, the rigidity of the extending part as a whole is enhanced so that a passenger can apply his or her weight onto the extending part.

<14> In the above-described aspect, the first part may have a first upper surface generally parallel to the floor surface. The first upper surface may have a plurality of recesses or protrusions.

According to this aspect, the possibility that a passenger's foot slips on the first part is reduced. In this aspect, like the first upper surface, the floor surface may have a plurality of recesses or protrusions. According to this aspect, the possibility that a passenger's foot slips on the floor surface is reduced. Further, the designability of the whole floor surface including the first upper surface of the extending part is improved.

<15> In the above-described aspect, the first part may have a pair of side walls extending in the up-down direction, and an upper wall connected to upper ends of the side walls and generally parallel to the floor surface. The first part may be open at a bottom part opposed to the upper wall. Lower ends of the side walls may abut an upper wall of the floor tunnel. The upper wall of the floor tunnel may be opposed to the upper wall of the first part.

According to this aspect, compared with a structure in which the first part has a lower wall, the duct can be reduced in weight.

<16> In the above-described aspect, the vehicle may have a compressor configured to compress a refrigerant and arranged in a rear part of the vehicle. The vehicle may have a refrigerant pipe for the refrigerant, extending in the front-rear direction within the floor tunnel and connected between the compressor and the air blower.

According to this aspect, the duct is arranged above the floor tunnel, so that the space in the floor tunnel can be effectively utilized. Thus, an air conditioning system can be provided in which the refrigerant pipe is arranged in the floor tunnel, the compressor is arranged in the rear part of the vehicle body, and the air blower is arranged in the front part of the vehicle body.

<17> In the above-described aspect, the first end part may be connected to at least part of the outlet of the air blower.

According to this aspect, the environment of the rear half portion of the cabin can be improved by connecting the first end part to the outlet of the air blower.

<18> In the above-described aspect, the first end part may have a mounting part removably mounted to the air blower.

According to this aspect, the duct can be attached and detached to the vehicle body of the utility vehicle according to user's needs.

<19> In the above-described aspect, the vehicle may have a front pillar, a center pillar, and an upper pillar for supporting a roof, which form part of a ROPS (rollover protective structure). The extending part may be arranged along the front pillar and the upper pillar. The opening part of the second end part may be arranged generally in the same position as or rearward of the center pillar in the front-rear direction.

According to this aspect, the duct is prevented from being affected by exhaust heat and foreign matters, so that the utility vehicle is provided with the duct having an arrangement structure suitable for off-road travelling.

<20> In the above-described aspect, the vehicle may have a front pillar, a center pillar, and an upper pillar for supporting a roof, which form part of a ROPS (rollover protective structure). At least the front pillar and the upper pillar may be formed in a tubular shape to communicate with each other in the inside. A front end of the front pillar may be connected to the air blower via the first end part such that air blown out from the air blower flows to the front pillar. The upper pillar may have an upper opening formed generally in the same position as or rearward of the center pillar in the front-rear direction and open to a rear half portion of the cabin. The front pillar and the upper pillar may serve as the extending part. The upper opening may serve as the opening part of the second end part.

According to this aspect, part of the pillars can be utilized as a duct. Further, the duct is prevented from being affected by exhaust heat and foreign matters, so that the utility vehicle is provided with the duct having an arrangement structure suitable for off-road travelling.

The invention claimed is:

1. A utility vehicle for travelling on rough terrain, comprising:
   a cabin;
   a floor panel that includes a floor tunnel extending in a front-rear direction that is a length direction of the vehicle, the floor panel defines a floor surface of the cabin;
   an air blower that is arranged in a front part of the vehicle and has an outlet to blow air into the cabin; and
   a duct that guides air from the air blower to a rear half portion of the cabin,
   wherein:
   the duct includes:
       a first end part that is connected to the air blower,
       a second end part including an opening part open to the rear half portion of the cabin, and
       an extending part that extends between the first and second end parts and includes a first part extending in the front-rear direction, and
   the whole duct is arranged above the floor tunnel in an up-down direction of the vehicle.

2. The vehicle as defined in claim 1, wherein the extending part and the second end part are exposed into the cabin.

3. The vehicle as defined in claim 1, wherein the whole duct is exposed into the cabin.

4. The vehicle as defined in claim 1, wherein the first part is placed on an upper surface of the floor tunnel.

5. The vehicle as defined in claim 1, wherein the first part is arranged in the center in a width direction of the vehicle.

6. The vehicle as defined in claim 1, wherein the extending part includes a second part that connects the first end part and the first part and is formed along a front panel that defines a front wall of the cabin.

7. The vehicle as defined in claim 1, wherein the first part includes an enlarged diameter part formed to have a cross section orthogonal to the front-rear direction that increases toward the second end part.

8. The vehicle as defined in claim 7, comprising:
   a front seat part that is arranged in a front half portion of the cabin, the front seat part including first and second front seats spaced apart from each other in a width direction of the vehicle and a third front seat provided between the first and second front seats,
   wherein the enlarged diameter part overlaps the third front seat in plan view.

9. The vehicle as defined in claim 4, wherein the first part includes a flat part having a height in the up-down direction that is smaller than a width in a width direction of the vehicle.

10. The vehicle as defined in claim 9, comprising:
   a front seat part that is arranged in a front half portion of the cabin,
   wherein at least part of the flat part is arranged forward of the front seat part.

11. The vehicle as defined in claim 4, wherein the first part includes a reinforcing wall provided inside the first part and extending in the up-down direction.

12. The vehicle as defined in claim 4, wherein:
   the first part includes a first upper surface generally parallel to the floor surface, and
   the first upper surface includes a plurality of recesses or protrusions.

13. The vehicle as defined in claim 4, wherein:
   the first part includes a pair of side walls extending in the up-down direction, and an upper wall connected to upper ends of the side walls and generally parallel to the floor surface,
   the first part is open at a bottom part opposed to the upper wall,
   lower ends of the side walls abut an upper wall of the floor tunnel, and
   the upper wall of the floor tunnel is opposed to the upper wall of the first part.

14. The vehicle as defined in claim 1, comprising:
   a compressor that compresses a refrigerant and arranged in a rear part of the vehicle, and
   a refrigerant pipe for the refrigerant, extending in the front-rear direction within the floor tunnel and connected between the compressor and the air blower.

15. The vehicle as defined in claim 1, wherein the first end part is connected to at least part of the outlet of the air blower.

16. The vehicle as defined in claim 1, wherein the first end part includes a mounting part removably mounted to the air blower.

17. The vehicle as defined in claim 1, comprising:
   a front pillar, a center pillar, and an upper pillar for supporting a roof, which form part of a ROPS (rollover protective structure),
   wherein:
   the extending part is arranged along the front pillar and the upper pillar, and
   the opening part of the second end part is arranged generally in the same position as or rearward of the center pillar in the front-rear direction.

18. The vehicle as defined in claim 1, comprising:
   a front pillar, a center pillar, and an upper pillar for supporting a roof, which form part of a ROPS (rollover protective structure),
   wherein:
   at least the front pillar and the upper pillar are formed in a tubular shape to communicate with each other in the inside,
   a front end of the front pillar is connected to the air blower via the first end part such that air blown out from the air blower flows to the front pillar,
   the upper pillar includes an upper opening formed generally in the same position as or rearward of the center pillar in the front-rear direction and open to a rear half portion of the cabin,
   the front pillar and the upper pillar serve as the extending part, and
   the upper opening serves as the opening part of the second end part.

19. A utility vehicle for travelling on rough terrain, comprising:
   a cabin;
   a floor panel that includes a floor tunnel extending in a front-rear direction that is a length direction of the vehicle, the floor panel defines a floor surface of the cabin;
   an air blower that is arranged in a front part of the vehicle and has an outlet to blow air into the cabin; and
   a duct that guides air from the air blower to a rear half portion of the cabin,
   wherein:
   the duct includes:
      a first end part that is connected to the air blower,
      a second end part including an opening part open to the rear half portion of the cabin, and
      an extending part that extends between the first and second end parts and includes a first part extending in the front-rear direction,
   the whole duct is arranged above the floor tunnel in an up-down direction of the vehicle,
   the first part is placed on an upper surface of the floor tunnel,
   the first part includes a first upper surface generally parallel to the floor surface,
   the first upper surface includes a nonslip part having a plurality of recesses or protrusions.

20. The vehicle as defined in claim 19, wherein the first part, which has the nonslip part, is positioned lower than the second end part.

* * * * *